United States Patent [19]
Malzahn et al.

[11] Patent Number: 6,032,169
[45] Date of Patent: Feb. 29, 2000

[54] ARITHMETIC CIRCUIT FOR CALCULATING A SQUARE

[75] Inventors: Ralf Malzahn, Seevetal, Germany; Jean-Jacques Quisquater, Rode-Saint-Genèse, Belgium

[73] Assignee: U.S. Philips Corporation, New York, N.Y.

[21] Appl. No.: 09/035,434

[22] Filed: Mar. 5, 1998

[30] Foreign Application Priority Data

Mar. 6, 1997 [DE] Germany .............................. 197 09 106

[51] Int. Cl.[7] ........................................................ G06F 7/38
[52] U.S. Cl. ............................................................ 708/606
[58] Field of Search ................................... 708/270, 277, 708/491, 492, 606, 620, 625, 627, 628, 632

[56] References Cited

U.S. PATENT DOCUMENTS

| | | | |
|---|---|---|---|
| 5,195,052 | 3/1993 | Karim ...................................... | 708/606 |
| 5,629,885 | 5/1997 | Pirson et al. ........................... | 708/606 |

FOREIGN PATENT DOCUMENTS 0443679A   8/1991   European Pat. Off. .......... G06F 7/72

OTHER PUBLICATIONS

By Zuras D., On Squaring and Multiplying Large Integers Proceedings of the Symposium on Computer Arithmetic, Windsor, Jun. 29–Jul. 23, 1993, pp. –271.

By Arts H.M.A.M. Arts et al. "Flexible Block–Multiplier Generation" International Conference on Computer Aided Design. (ICCAD), Santa Clara, Nov. 11–14, 1991. 106–108.

By Bong D. et al. "Optimized Software Implementations of the Modular Implementations on General Purpose Microprocessors" Computers & Security International Journal Devoted to the Study of Technical and Financial Aspects of Computer Security. Nov. 1989. pp. 621–630.

*Primary Examiner*—Ohuong Dinh Ngo

[57] ABSTRACT

In order to enable calculation of the square of a number comprising many digits by means of an arithmetic circuit which is arranged for the parallel processing of numbers having a substantially smaller number of digits, the number to be squared is subdivided into sub-numbers having a number of digits which is compatible with the arithmetic circuit, the individual sub-numbers being successively processed. For faster processing in the case of squaring operations, the multiplier circuit provided in the arithmetic circuit includes a position shift circuit capable of performing a shift of one position to the left in the case of multiplication of given pairs of sub-numbers, which shift corresponds to a multiplication by the factor 2. As a result, squaring can be performed while using fewer technical means. A method operating on the basis thereof so as to form the square of a large number modulo another large number is also disclosed.

3 Claims, 1 Drawing Sheet

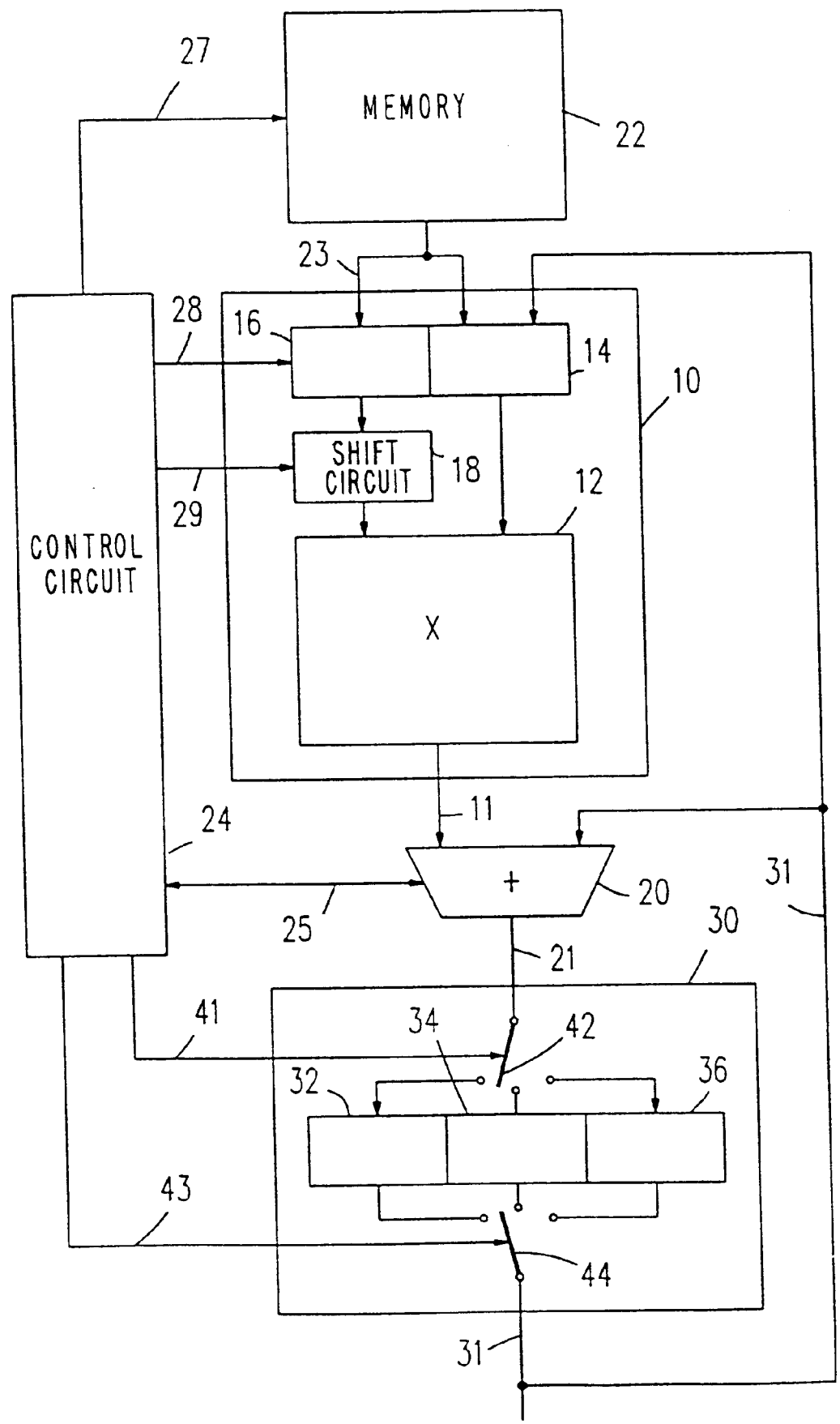

ARITHMETIC CIRCUIT FOR CALCULATING A SQUARE

BACKGROUND OF THE INVENTION

The invention relates to an arithmetic circuit for calculating the square of a number. The formation of a square corresponds to the multiplication of two equal numbers.

The multiplication of two numbers can be performed by means of known multiplier circuit which include two inputs which receive the numbers to be multiplied and an output which delivers the product. Multi-digit numbers can then be processed in parallel so that a multiplication can be very quickly performed. This holds at least for as long as the number of digits, or the word width, of the numbers to be multiplied does not exceed the number of bits that can be processed in parallel by a multiplier. An increasing amount of technical means are required for the multiplier circuits as the number of digits to be processed in parallel increases. Therefore, for many applications use is made of multipliers for the processing of data words of given length, notably for 8-bit data words or bytes, or a multiple thereof; the two inputs of the multiplier may then be suitable for different word widths.

In many applications, however, the data words to be processed are significantly longer; for example, in the case of encryption of data streams by means of keys comprising a large number of digits so as to achieve a high encryption reliability. In order to process such large numbers, they are subdivided into successive segments or sub-words which comprise the same number of digits, amounting to one or more bytes, and the individual sub-numbers are successively processed. More processing time is then required, but the required amount of technical means remains limited. These technical means include an adder, coupled to the output of the multiplier, as well as a register for a number of sub-numbers corresponding to the product of the large numbers to be multiplied. Also required is a control circuit which controls the presentation of the individual sub-numbers and the positionally correct addition of the individual intermediate products or sub-products, supplied by the multiplier, to the sub-results stored in the memory.

SUMMARY OF THE INVENTION

It is an object of the invention to reduce the calculation time required in an arithmetic circuit of the kind set forth for the formation of the square of long numbers consisting of a plurality of sub-numbers.

This object is achieved in that the multiplier circuit includes a controllable shift circuit which is connected between one of the inputs and the output in order to perform, at option, either a shift of one position to the left, corresponding to a multiplication by the factor 2, or no shift, the control circuit being arranged to apply, for each first sub-number applied to one input of the multiplier circuit, successively only a second sub-number of the same or higher significance to the other input and to switch the shift circuit over for a shift of one position to the left when a second sub-number having a significance higher than that of the first sub-number is supplied.

This solution utilizes the fact that during the multiplication of the individual sub-numbers the pairs of sub-numbers of different value, to be multiplied by one another, always occur twice and hence need be calculated only once. Therefore, this multiplication need be executed only once and, moreover, adding operations are thus saved. This results in significant speeding up of the calculation of the square of a large number while requiring only limited additional means in the form of the shift circuit.

In many cryptologic encryption methods calculations of the data to be encrypted are performed modulo a given fixed number, so that the results have a limited number of digits which is smaller than, for example the product of two large numbers or the square of a large number. Such a method is, for example the RSA encryption method. For the calculation of the square of a first large number modulo a second large number, the control device in the arithmetic circuit in an embodiment of the invention is arranged to supply, each time after a first multiplication of a first sub-number by all second sub-numbers of the same and higher significance, starting with the most significant first sub-number in order to form a respective first product, one input of the multiplier with the most significant sub-number of the first product and the other input successively with the sub-numbers of the two's complement of the second number in order to form a second product from sub-products of successive significance, and to control the adder and the register in such a manner that the sub-products are positionally correctly added to the content of the register cell corresponding to the significance. This version combines the described method of forming the square of a long number with a modulo calculation method which can be derived from EP 443 679 A1.

In this version of the invention a carry may occur when the most significant sub-number but one of the first product is added to the most significant sub-number of the second product. In order to minimize the effects on the further calculation process in such a case, the second number is advantageously subtracted from the sum when such a carry occurs. This can be realized by simply adding the two's complement of the second number in the sum.

BRIEF DESCRIPTION OF THE DRAWING

An embodiment of the invention will be described in detail hereinafter with reference to the drawing.

The drawing shows a circuit in accordance with the invention.

DESCRIPTION OF THE PREFERRED EMBODIMENTS

Therein, a multiplier circuit 10 includes a multiplier 12 for the parallel multiplication of two multi-bit data words which are applied to two inputs in order to produce at the output 11 a multi-bit product which comprises a number of bits which corresponds to the sum of the numbers of bits of the applied data words. One input of the multiplier 12 is preceded by a register 14 whereas the other input is preceded by the series connection of a register 16 and a shift circuit 18. The register 14 and 16 and the shift circuit 18 are controlled, via the connection 28 and 29, by a control circuit 24. The control circuit is, for example a programmed microprocessor or the core of a microprocessor.

Via a connection 27, the control circuit 24 also controls a memory 22 which contains at least a first number and a second number, both of which consist of a number of sub-numbers of successive significance. It is assumed that a sub-number, to be output via an output 23, is stored at each address of the memory 22 which can be selected via the connection 27.

Said output 23 is connected to an input of the register 16 and to an input of the register 14, the latter also having a further input which is connected to a multiwire line 31. The register 14 may instead be preceded by a multiplexer (not shown) which combines the multiwire lines 23 and 31 so as to form one multiwire line so that the register 14 has only one input in that case. Via the connection 28, the control circuit 24 controls whether a data word output via the output 23 of the memory 22 is stored in the register 14 or in the register 16 or whether a data word present on the line 31 is written into the register 14. Via the connection 29, the control circuit 24 also controls whether the data word present in the register 16 is applied directly, via the shift circuit 18, or is shifted one position higher, corresponding to a multiplication by the factor 2.

The output 11 is connected to an input of an adder 20 which is preferably constructed as an ALU; if the control circuit 24 is formed by a microprocessor, the adder may be included therein. In the present example the adder 20 is shown separately for the sake of clarity.

A second input of the adder 20 is also connected to the line 31 and an output 21 of the adder is connected to a register 30 which comprises three register cells 32, 34 and 36 for storing a respective data word each. In the register the connection 21 leads to a switch or selector 42 which connects, via a connection 41 and under the control of the control circuit 24, the line 21 to an input of the storage cell 32, 34 or 36. Analogously, there is provided a selector 44 which connects, via a connection 43 and under the control of the control circuit 24, an output of the storage cell 32, 34 or 36 to the line 31.

In order to explain the function of the arithmetic circuit shown, first a description will be given of the principle of the squaring of a long number X which comprises a large number of digits and can be represented as a sum of sub-numbers $X_n, X_{n-1} \ldots X_0$, each sub-number $X_i$ comprising a number k digits or bits. When a base $b=2^k$ is defined, the long number X can be represented as follows:

$$X = X_a \cdot b^n + X_{n-1} \cdot b^{n-1} + \ldots X_1 \cdot b^1 + X_0.$$

Therein, $b^i$ represents the significance of the relevant sub-number. This representation of the long number is based on the assumption that it is processed in an arithmetic circuit capable of processing such sub-numbers in parallel.

The squaring of such a long number can be represented as follows:

$$(X_n \cdot b^n + X_{n-1} \cdot b^{n-1} + \ldots + X_1 \cdot b^1 + X_0) \cdot (X_n \cdot b^n + X_{n-1} \cdot b^{n-1} + \ldots + X_1 \cdot X_1 \cdot b^1 + X_0).$$

It appears that all fields of the following matrix must be calculated in order to execute the squaring operation, the powers of b corresponding to a positionally correct addition, and i and j corresponding to the first and the second sub-number, respectively, of corresponding significance.

|       | i = 0 | i = 1 | i = 2 | i = 3 | ... i = n |
|---|---|---|---|---|---|
| j = 0 | $X_0^2$ | $X_1 \cdot X_0 \cdot b$ | $X_2 \cdot X_0 \cdot b^2$ | $X_3 \cdot X_0 \cdot b_3$ | ... $X_n \cdot X_0 \cdot b^n$ |
| j = 1 | $X_0 \cdot X_1 \cdot b$ | $X_1^2 \cdot b^2$ | $X_2 \cdot X_1 \cdot b^3$ | $X_3 \cdot X_1 \cdot b^4$ | ... $X_n \cdot X_1 \cdot b^{n+1}$ |
| j = 2 | $X_0 \cdot X_2 \cdot b^2$ | $X_1 \cdot X_2 \cdot b^3$ | $X_2^2 \cdot b^4$ | $X_3 \cdot X_2 \cdot b^5$ | ... $X_n \cdot X_2 \cdot b^{n+2}$ |
| j = 3 | $X_0 \cdot X_3 \cdot b^3$ | $X_1 \cdot X_3 \cdot b^4$ | $X_2 \cdot X_3 \cdot b^5$ | $X_3^2 \cdot b^6$ | ... $X_n \cdot X_3 \cdot b^{n+3}$ |
| ... | ... | ... | ... | ... | ... |
| j = n | $X_0 \cdot X_n \cdot b^n$ | $X_1 \cdot X_n \cdot b^{n+1}$ | $X_2 \cdot X_n \cdot b^{n+2}$ | $X_3 \cdot X_n \cdot b^{n+3}$ | ... $X_n^2 \cdot b^{2n}$ |

Because in the case of a scalar multiplication, as connected here, the sequence of the factors is not important, the squaring operation can be represented in the form of the following matrix which is occupied only half.

|       | i = 0 | i = 1 | i = 2 | i = 3 | ... i = n |
|---|---|---|---|---|---|
| j = 0 | $X_0^2$ | $2X_1 \cdot X_0 \cdot b$ | $2X_2 \cdot X_0 \cdot b^2$ | $2X_3 \cdot X_0 \cdot b^3$ | ... $2X_n \cdot X_0 \cdot b^n$ |
| j = 1 |  | $X_1^2 \cdot b^2$ | $2X_2 \cdot X_1 \cdot b^3$ | $2X_3 \cdot X_1 \cdot b^4$ | ... $2X_n \cdot X_1 \cdot b^{n+1}$ |
| j = 2 |  |  | $X_2^2 \cdot b^4$ | $2X_3 \cdot X_2 \cdot b^5$ | ... $2X_n \cdot X_2 \cdot b^{n+2}$ |
| j = 3 |  |  |  | $X^2 \cdot b^6$ | ... $2X_n \cdot X_3 \cdot b^{n+3}$ |
| ... |  |  |  |  | ... |
| j = n |  |  |  |  | $X_n^2 \cdot b^{2n}$ |

It appears that the square can be formed faster when use is made of a multiplier circuit which allows for one of the factors to be multiplied additionally by the factor 2. This can be realized in a very simple manner in that one of the factors can be shifted one bit position to the left, corresponding to a multiplication by 2. In the arithmetic circuit shown this is achieved by the shift circuit 18; it will be apparent from the above explanation that this shift circuit 18 may also be arranged between the register 14 and the corresponding input of the multiplier 12. This shift circuit may in principle also be provided at the output of the multiplier 12, be it that the circuit should then be constructed for double the number of bits.

The result of the calculation represented by the matrix, i.e. the square of a long number comprising (n+k) bits, is then obtained by addition of the sub-products of the same significance in the individual fields of the matrix, i.e. the sub-products with the same power of b. However, in order to achieve a minimum number of transfers of data words from the memory 22 to the multiplier circuit 10, it is advantageous to determine the individual sub-products of the matrix per row or per column, positionally correct addition of the sub-products in the adder 20 being achieved value, i.e. the value 1 in all positions, so that the most significant sub-number in the two's complement has the value 0 in all positions.

The calculation of the square $X^2$ of a long number $X=X_3, X_2, X_1, X_0$ modulo $N=N_3, N_2, N_1, N_0$, where $N_3 32$ b−1, is then performed in conformity with the following chart:

|  |  |  |  |  |  |  |
|---|---|---|---|---|---|---|
| $X_3 \cdot X_3$: | Ca | $X_3 X_3$ | 0 | 0 | 0 |  |
| $M \cdot Ca$: |  | Cb | $Ca \cdot M_2$ | $Ca \cdot M_1$ | $Ca \cdot M_0$ |  |
| Add | $Ra_3$ | $Ra_2$ | $Ra_1$ | $Ra_0$ |  |  |
| $(2X_3 + X_2) \cdot X_2$: | $C_2$ | $2 \cdot X_3 X_2$ | $X_2 X_2$ | 0 |  |  |
| Add | Cc | $Rb_3$ | $Rb_2$ | $Rb_1$ | 0 |  |
| $M \cdot Cc$: |  | Cd | $Cc \cdot M_2$ | $Cc \cdot M_1$ | $Cc \cdot M_0$ |  |
| Add |  | $Rc_3$ | $Rc_2$ | $Rc_1$ | $Rc_0$ |  |
| $(2X_3 X_2 + X_1) \cdot X_1$: |  | $C_1$ | $2 \cdot X_3 X_1$ | $2 \cdot X_2 X_1$ | $X_1 X_1$ |  |
| Add |  | Ce | $Rd_3$ | $Rd_2$ | $Rd_1$ | 0 |
| $M \cdot Ce$: |  |  | Cf | $Ce \cdot M_2$ | $Ce \cdot M_1$ | $Ce \cdot M_0$ |
| Add |  |  | $Re_3$ | $Re_2$ | $Re_1$ | $Re_0$ |
| $(2X_3 X_2 X_1 + X_0) \cdot X_0$: |  |  | $C_0$ | $2 \cdot X_3 X_0$ | $2 \cdot X_2 X_0$ | $2 \cdot X_1 X_0$ | $X_0 X_0$ |
| Add |  |  | Cg | $Rf_3$ | $Rf_2$ | $Rf_1$ | $Rf_0$ |
| $M \cdot Cg$: |  |  |  | Ch | $Cg \cdot M_2$ | $Cg \cdot M_1$ | $Cg \cdot M_0$ |
|  |  |  |  | $R_3$ | $R_2$ | $R_1$ | $R_0$ | by appropriate control of the register cells 32, 34 or 36 by the control circuit 24. It will be evident that the number of register cells in the register 30 must be chosen in conformity with the number of digits of the long numbers to be processed. Because the individual sub-products at the output 11 of the multiplier circuit 10 comprise double the number of digits in comparison with a sub-number, either the adder 10 and each of the register cells 32, 34, 36 must be conceived for this number of digits of the sub-product, or the adder 20 and the register cells 32, 34, 36 have the length of a sub-number, in which case each sub-product has to be processed in two steps, requiring more time but fewer technical means. In the latter case the number of register cells amounts to twice the number of sub-numbers of the long number. In any case, the number of digits of the result, i.e. the square of the long number, is double that of the long number.

Notably in cryptologic encryption operations, calculations, notably also squaring, are performed, modulo a number which may also comprise a large number of digits with a view to the reliability requirements imposed on the encryption; for example, this number of digits may be of the order of magnitude of or equal to that of the long number. This modulo calculation can be performed on the final square of the long number. However, in that case very many digits must be taken into account, requiring more hardware and/or time. A simpler possibility, to be described hereinafter, can be deduced from EP 443 679 A1. According to this method, arbitrary long numbers X and Y are multiplied by one another while being stepwise reduced in relation to the modules N, so that the overall number of digits of all intermediate products will not become significantly larger than the number of digits of a sub-number. To this end, the two's complement M of the modulus N is required, the modulus N having to be normalized in such a manner that the most significant sub-number has the highest In this chart the individual sub-products and sub-sums are positionally correctly arranged one below the other in columns, each column containing a number with a number of digits equal to that of the sub-words. It is to be noted that the product of two sub-words has double the number of digits. For example, the product $X_3 \cdot X_3$ offers a number having a length of two sub-words, the more-significant sub-word being denoted by the reference Ca. Analogously, for example in the product $Ca \cdot M_1$ the more significant sub-product of $Ca \cdot M_0$ is contained. It will be apparent that the longest sub-result has a number of digits equal to the sum of the numbers of digits of the long word and a sub-word, be it that a carry may occur in given cases. Moreover, the number of transfers of different sub-words, notably from the memory 22 to the multiplier circuit 10, is as low as possible. However, if a carry occurs in given cases. Moreover, the number of transfers of different sub-words, notably from the memory 22 to the multiplier circuit 10, is as low as possible. However, if a carry occurs after the most-significant sub-word of an intermediate result has been multiplied by the two's complement M of the modulus N and added to the intermediate result, a correction step must be inserted in which the modulus N must be subtracted from the intermediate result for which a carry has occurred; this can also be achieved by addition of the two's complement M of the modulus N. To this end, an additional data pat (not shown) may be provided between the output 23 of the memory 22 and the adder 20, or the value 1 can be applied to one of the two registers 14 and 16 so that a data word applied to the other register appears at the output 11 without change.

Hereinafter a program is given which indicates the processing steps to be performed by the arithmetic circuit, notably by the control circuit 24 included therein, in order to calculate the square $X^2$ of a long number X modulo a further long number N. Therein, the function "Result (XH,X,Y,Z, MUL2)" calculates the expression $$2^{MUL2} \cdot (XH \cdot b + X) \cdot Y + Z + \text{carry}$$

and directly returns the least-significant sub-word of the result, whereas the more significant bits of the result are kept in the internal variable "carry". This carry can be erased by means of "Clear Carry" and read by means of "Get Carry".

```
for (i=0; i<param->XLEN; i++)
r[i]=0;
for (i=param->XLEN-1; i>0; i--) {
rPtr=i-1;
ClearCarry0;
r[rPtr]=Result(0,x[i],x[i],r[rPtr],0);   /* (XH,X,Y,Z,MUL2) */
rPtr++;
if (i==param->XLEN-1)
param->CRY=GetCarry0 & 1;
for (j=i+1; j<param->XLEN; j++) {
r[rPtr]=Result(0,x[i],x[j],r[rPtr],1); /* (XH,X,Y,Z,MUL2) */
rPtr++
}
mult=Result(0,0,0,r[rPtr],0);   /* (XH,X,Y,Z,MUL2) */
xh=(BYTE)GetCarry0 & 3;   /* factor for reduction */
ClearCarry0;   /* multiply N * (xh,mult)*/
oldBuffer =0;
for(j=0; j<param->XLEN;j++) {
buffer=r[j];
r[j]=Result(xh, mult, zn[j],oldBuffer,0);   /*(XH,X, Y, Z,MUL2) */
oldBuffer =buffer;
}
car=(BYTE)GetCarry0 & 1;   /* get LSB of carry */
if(car==1) {   /* correct if necessary */
ClearCarry0;
for j=0; j<param->XLEN; j++)
r[j]=Result(0,zn[j],1,r[j],0);   /* (XH,X,Y,Z,MUL2) */
}
}
ClearCarry0;
oldBuffer =r[0];
r[0]=Result(0,x[0],x[0],0,0);   /* (XH,X,Y,Z,MUL2) */
for(j=1;j<param->XLEN;j++) {
buffer=r[j];
r[j]=Result(0,x[0],x[j],oldBuffer, 1);   /* XH,X,Y,Z,MUL2) */
oldBuffer =buffer;
}
mult=Result(0,0,0,oldBuffer,0);   /* (XH,X,Y,Z,MUL2) */
xh=(BYTE)GetCarry0 & 3;   /* factor for reduction */
ClearCarry0;   /* MUTIPLY N * (xh,mult) */
for(j=0; j<param->XLEN;j++) {
r[j]=Result(xh,mult,zn[j],r[j],0);   /* (XH,X,Y,Z,MUL2) */
}
car=(BYTE)GetCarry0 & 1;   /* get LSB of carry */
if(car==1) {   /* correct if necessary */
ClearCarry0;
for (j=0;j<param->XLEN;j++)
r[j]=Result(0,zn[j],1,r[j],0);   /* (XH,X,Y,Z,MUL2) */
}
```

We claim:

1. An arithmetic circuit for calculating the square of a first number presented in the form of a concatenation of sub-numbers of successive significance, each of which comprises the same number of digits, which circuit includes:

a multiplier circuit having at least two inputs, each of which is intended for a sub-number, and one output for supplying a product, having twice the length of the sub-numbers, for the parallel multiplication of each time a first sub-number and a second sub-number of the first number;

an adder having one output and at least two inputs, a first input being connectable to the output of the multiplier circuit;

a register having a plurality of register cells for storing a plurality of sub-numbers, which register comprises an input which can be coupled to the output of the adder in order to receive a sub-word and to store the sub-word in a selected register cell, and an output which can be coupled to the second input of the adder in order to output a sub-word from a selected register cell, and A control circuit for controlling the successive supply of two sub-numbers to the multiplier circuit and for controlling the adder and the register for positionally correct addition of the product obtained at the output of the multiplier circuit to the content of the appropriate register cell of the register, characterized in that the multiplier circuit includes a controllable shift circuit which is connected between one of the inputs and the output in order to perform, at option, either a shift of one position to the left, corresponding to a multiplication by the factor 2, or not shift, the control circuit being arranged to apply, for each first sub-number applied to one input of the multiplier circuit, successively only a second sub-number of the same or higher significance to the other input and to switch the shift circuit over for a shift of one position to the left when a second sub-number having a significance higher than that of the first sub-number is supplied.

2. An arithmetic circuit as claimed in claim 1, characterized in that for the calculation of the square of the first number modulo a second number, also being presented in the form of a concatenation of sub-numbers, the most significant sub-number thereof having the highest possible value, the control device is arranged to supply, each time after a first multiplication of a first sub-number by all second sub-numbers of the same and higher significance, starting with the most-significant first sub-number, one input of the multiplier with the most significant sub-number of the first product, and the other input successively with the sub-numbers of the two's complement of the second number in order to form a second product from sub-products of successive significance, and to control the adder and the register in such a manner that the sub-products are positionally correctly added to the content of the register cell corresponding to the significance.

3. An arithmetic circuit as claimed in claim 2, characterized in that the control circuit is arranged to test the occurrence of a carry for each addition of the most-significant sub-number but one of the first product to the most significant sub-number of the second product in order to form a first sum and to drive, upon detection of such a carry, the adder so as to subtract the second number from the first sum prior to the next addition.

* * * * *